(12) United States Patent
Grosjean

(10) Patent No.: US 11,520,059 B2
(45) Date of Patent: Dec. 6, 2022

(54) LITTLE INVASIVE DETECTOR OF IONISING RADIATION

(71) Applicants: CENTRE NATIONAL DE LA RECHERCHE SCIENTIFIQUE, Paris (FR); UNIVERSITE DE FRANCHE-COMTE, Besançon (FR)

(72) Inventor: Thierry Grosjean, Besançon (FR)

(73) Assignees: CENTRE NATIONAL DE LA RECHERCHE SCIENTIFIQUE, Paris (FR); UNIVERSITE DE FRANCHE-COMTE, Besançon (FR)

( * ) Notice: Subject to any disclaimer, the term of this patent is extended or adjusted under 35 U.S.C. 154(b) by 0 days.

(21) Appl. No.: 17/295,803

(22) PCT Filed: Sep. 27, 2019

(86) PCT No.: PCT/EP2019/076207
§ 371 (c)(1),
(2) Date: May 20, 2021

(87) PCT Pub. No.: WO2020/108827
PCT Pub. Date: Jun. 4, 2020

(65) Prior Publication Data
US 2022/0011449 A1 Jan. 13, 2022

(30) Foreign Application Priority Data
Nov. 30, 2018 (FR) ..................................... 1872117

(51) Int. Cl.
*G01T 1/20* (2006.01)
*G01D 5/26* (2006.01)

(52) U.S. Cl.
CPC ........... *G01T 1/2002* (2013.01); *G01D 5/268* (2013.01); *G01T 1/2006* (2013.01)

(58) Field of Classification Search
CPC ...... G01T 1/2002; G01T 1/2006; G01D 5/268
See application file for complete search history.

(56) References Cited

U.S. PATENT DOCUMENTS 5,166,073 A    11/1992  Lefkowitz et al.
5,635,717 A *  6/1997  Popescu .................. G01T 1/203
                                                       250/361 R
(Continued)

OTHER PUBLICATIONS

International Search Report and Written Opinion received for PCT/EP2019/076207, dated Jan. 15, 2020.
(Continued)

*Primary Examiner* — Hugh Maupin
(74) *Attorney, Agent, or Firm* — Greer, Burns & Crain, Ltd

(57) ABSTRACT

A detector of high-energy (higher than 100 eV) ionising radiation, including an optical fibre having an outside diameter, called the fibre diameter, smaller than 250 microns, including a fibre core, a first cladding, called the useful cladding, encircling the fibre core and a second cladding, called the protective cladding, encircling the useful cladding, and a scintillating layer provided to convert the ionising radiation into light; including a portion, called the detecting portion, arranged in a length of the fibre and having a void formed in the protective cladding, in the useful cladding, and possibly in the fibre core, the scintillating layer being arranged in the void in contact with the useful cladding and the fibre core.

15 Claims, 3 Drawing Sheets

(56) References Cited

U.S. PATENT DOCUMENTS

| | | | |
|---|---|---|---|
| 5,704,890 A | 1/1998 | Bliss et al. | |
| 5,905,262 A | 5/1999 | Spanswick | |
| 6,551,231 B1* | 4/2003 | Bliss | G01T 1/201 |
| | | | 385/12 |
| 2005/0203341 A1* | 9/2005 | Welker | A61B 1/07 |
| | | | 600/128 |

OTHER PUBLICATIONS

Search Report Received for French Application No. 1872117, dated Sep. 3, 2019.
Zhihua, X, et al., "Ultracompact x-ray dosimeter based on scintillators coupled to a nano-optical antenna," Optics Letters, vol. 42, No. 7, 2017, pp. 1361-1364.

* cited by examiner

[Figure 1a]
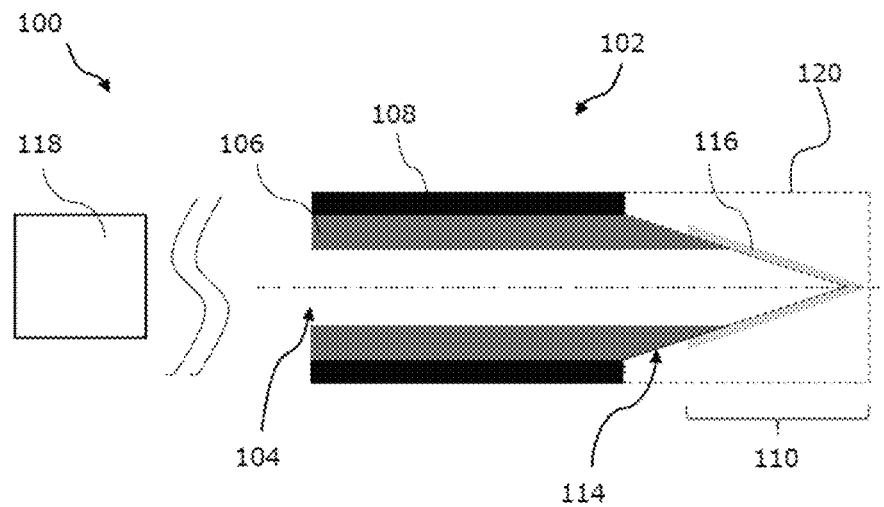
[Figure 1b]
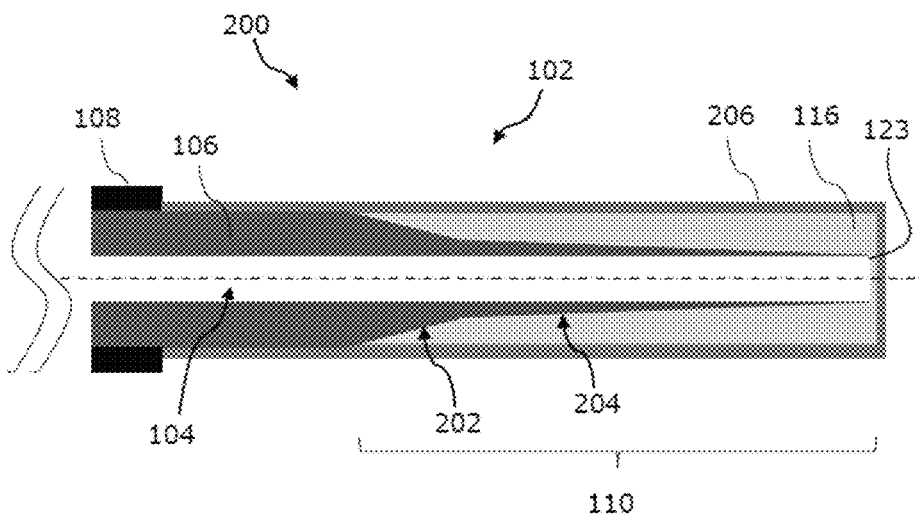
[Figure 1c]
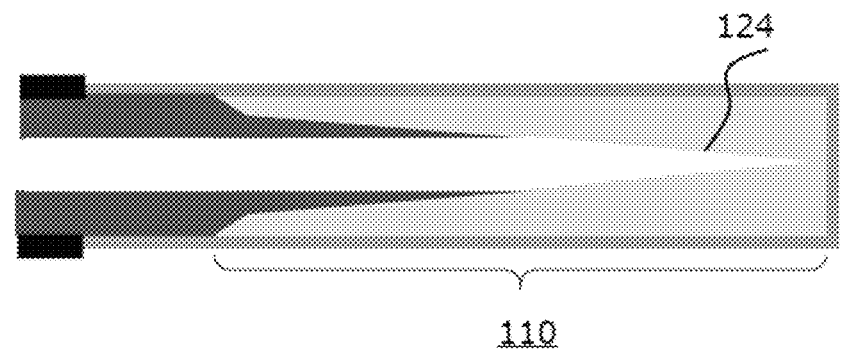

[Figure 1d]
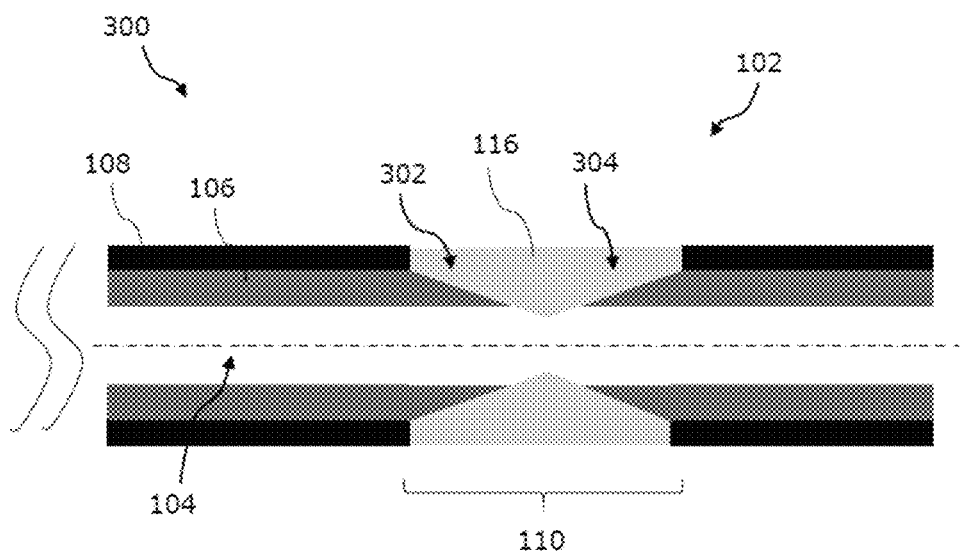
[Figure 1e]
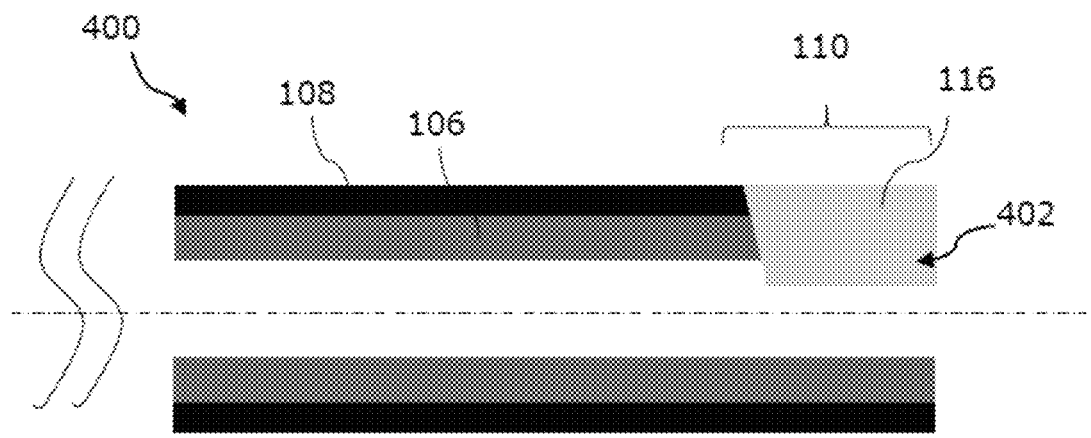

[Figure 2]
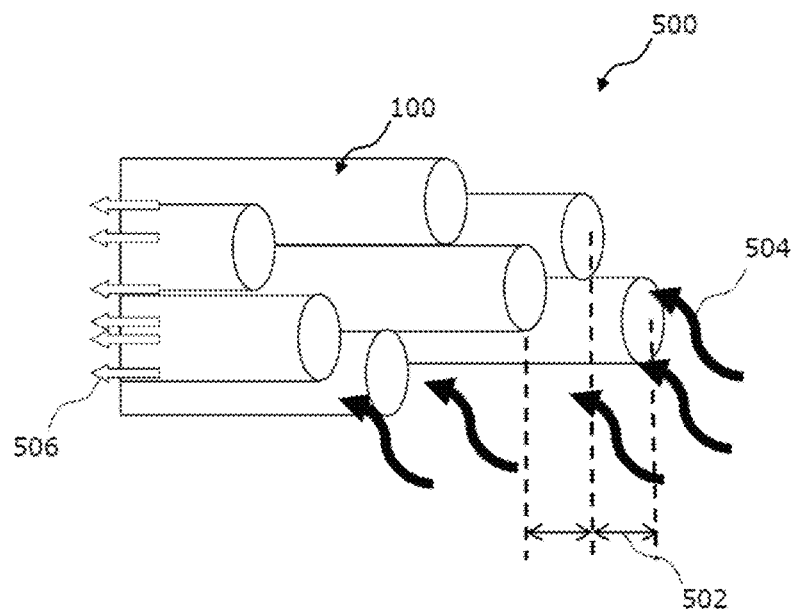
[Figure 3]
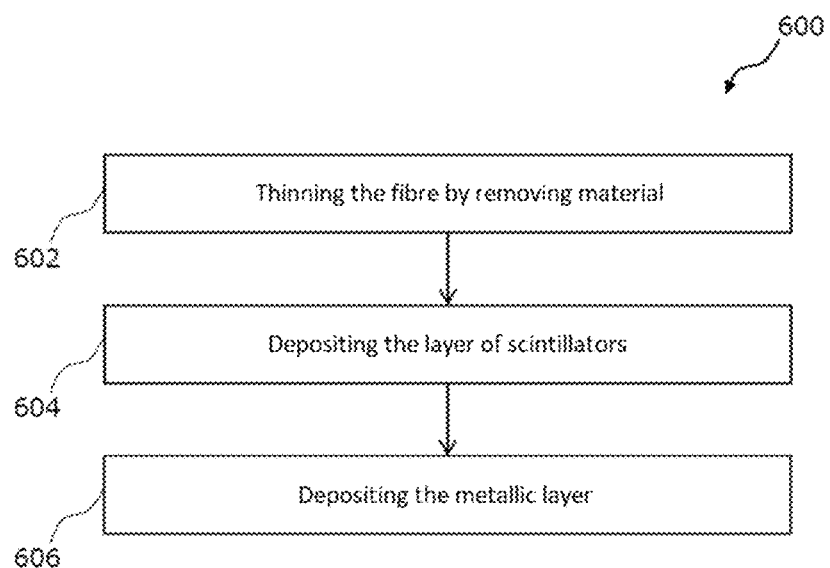

LITTLE INVASIVE DETECTOR OF IONISING RADIATION

BACKGROUND

The invention relates to a detector for high-energy ionizing radiation, greater than 100 eV.

The field of the invention is the field of ionizing radiation detection for medical or industrial imaging, and more particularly the field of detectors that are minimally or weakly invasive, or that have a negligible invasive footprint.

Ionizing radiation detectors are known comprising at least one optical fibre and scintillators that are sensitive to radiation and arranged at one end of the optical fibre. The scintillators, when subjected to ionizing radiation, emit light. The aim of these detectors is to capture a portion of this light and direct it for example towards a photodiode through the core of the fibre. However, these detectors are still bulky due to their weak intrinsic sensitivity, since these detectors are large so as to increase the overall sensitivity.

An aim of the present invention is to propose an ionizing radiation detector that is less bulky.

Another aim of the invention is to improve the sensitivity of such a detector by proposing a novel arrangement between the optical fibre and the scintillators.

SUMMARY

At least one of the above-mentioned aims is achieved by a detector for high-energy ionizing radiation, greater than 100 eV, comprising:

- an optical fibre having an outer diameter, called fibre diameter, less than 250 microns, and comprising a fibre core, a first cladding, called useful cladding, surrounding said fibre core and a second cladding, called protective cladding, surrounding said useful cladding, and
- a layer of scintillators provided to convert said ionizing radiation into light.

This detector is characterized in that it comprises a portion, called detection portion, arranged over a length of the fibre and comprising a recess formed in the protective cladding, in the useful cladding, and/or in the fibre core; the layer of scintillators being arranged in said recess in contact with the useful cladding and the fibre core.

With the detector according to the invention, the layer of scintillators is arranged in direct contact with the useful cladding and the fibre core over a wide contact surface. The optical coupling between the layer of scintillators and the optical fibre is thus improved. The detector is therefore more sensitive.

The case where the recess is only made in the fibre core is also envisaged.

The arrangement of the detector according to the invention allows a strong coupling between the fibre and the scintillators, and thus a larger luminescence signal at the output of the optical fibre and an increased sensitivity of the detector. This particular structure makes it possible to use fibres of very small size and thus:

- to have a sensor which, in a biological medium, does not attenuate the treatment radiation and does not disrupt the therapeutic process (notion of invisibility), and
- to have an ultracompact sensor having a very limited size.

The invention makes it possible to obtain an ultracompact detector on a thin optical fibre, the useful diameter of which can be less than 125 μm, 80 μm, or even 60 μm. Thus, the detector according to the invention has a negligible invasive footprint for the patient and is invisible in the envisaged therapy processes, regardless of the types of scintillators and fibres envisaged (organic or inorganic). The detector according to the invention is considered minimally invasive due to its reduced size compared with the devices of the prior art. As a result, it is described as minimally invasive because its use in the medical field for example requires a lesion with a very small size compared with the use of existing detectors.

The detector according to the invention can be arranged to detect ionizing radiation with an energy greater than 100 eV, preferably between 0.1 MeV and 500 MeV.

In an embodiment version of the detector according to the invention, the layer of scintillators is completely contained in the recess and is flush with the outer surface of the protective cladding.

The dimensions of the detector are not increased by the layer of scintillators. The detector according to the invention is thus less bulky than the detectors of the state of the art. The layer of scintillators can fill the recess and be flush with the outer surface of the useful cladding.

Advantageously, the detector according to the invention can comprise, in the detection portion, a metallic layer surrounding the layer of scintillators.

The metallic layer can be a layer that is thin enough for the ionizing radiation to be able to pass through and the luminescence originating from the scintillators to be reflected and redirected towards the optical fibre.

In particular, the metallic layer can be a deposit of aluminium and/or gold, with a thickness less than or equal to 10 microns, in particular less than or equal to 300 nm.

In a particular embodiment of the detector according to the invention, the detection portion can be arranged at the end of the fibre.

Preferably, the layer of scintillators can extend over the whole end of the fibre onto its transverse section. In other words, the scintillators are arranged on the lateral face of the thinned fibre and possibly on the transverse section right at the end of the fibre.

The metallic layer can also extend around the layer of scintillators at the end of the fibre.

In a particular embodiment of the detector according to the invention, the detection portion can be arranged at a non-zero distance from the end of the fibre.

In particular, the detection portion can be arranged at a distance comprised between 0.1 cm and 1 cm from the end of the fibre.

In particular, the recess can extend inside the core of the fibre so that the layer of scintillators is in direct contact with the inside of the fibre core.

In an advantageous embodiment of the detector according to the invention, the recess can extend around the axis of revolution of the fibre.

With such a recess produced around the entirety of a section of the useful cladding, the coupling between the layer of scintillators and the fibre is thus improved and the detector becomes isotropic in the case where the recess is covered with a homogeneous layer of scintillators. The isotropic nature means that the same signal is detected under irradiation by an ionizing beam while the fibre is being turned along its axis of revolution. This feature is of interest in particular in the medical field.

In a preferred embodiment of the detector according to the invention, the recess can form a cone in the detection portion.

In particular, said cone can be arranged at the end of the fibre and extend into the useful cladding and the fibre core. This arrangement improves the optical coupling between the layer of scintillators and the fibre core. The luminescence emitted by the scintillators and directed towards the fibre is thus increased. The detector according to the invention is therefore more sensitive.

Moreover, the recess can form a frustoconical portion, in the detection portion, arranged at a distance from, or at, the end of the fibre.

In an embodiment of the detector according to the invention, the recess can form a cylindrical portion in the detection portion having a diameter smaller than the diameter of the fibre.

The diameter of the cylindrical portion can be less than or equal to 80% of the diameter of the fibre.

In particular, the recess can be produced by removing material from the useful cladding and/or the fibre core.

Advantageously, the fibre diameter can be less than or equal to 250 microns, in particular less than or equal to 95 microns, more particularly less than or equal to 80 microns, even more particularly less than or equal to 75 microns.

Preferably, the diameter of the core of the fibre is less than or equal to 110 microns, in particular less than or equal to 70 microns.

In an advantageous embodiment, the detector according to the invention can comprise a photon counter connected to the optical fibre.

The photon counter can be connected to an end of the fibre opposite the detection portion.

The layer of scintillators can be constituted by scintillators alone directly bonded to the useful cladding and/or the fibre core. It is also possible to envisage bonding or adhesion by electrostatic treatment of the surfaces of the fibre and of the scintillators.

The layer of scintillators can also be a mixture of a polymer, for example of the photosensitive type, and inorganic scintillators, and/or organic scintillators, for example in the form of powders.

Advantageously, the layer of scintillators can be assembled to the useful cladding by bonding, in particular by an adhesive that is transparent to luminescence.

In particular, the detection portion can have a length comprised between 0.1 mm and 5 mm.

Preferably, the thickness of the layer of scintillators can be less than or equal to 100 microns, in particular less than or equal to 50 microns.

According to an aspect of the invention, a method for manufacturing a detector for high-energy ionizing radiation according to the invention is proposed, comprising at least the following steps:
 thinning the optical fibre, over the detection portion, by removing the protective cladding and creating a recess in the useful cladding and/or in the core of the fibre, and
 depositing a layer of scintillators in said recess by photopolymerization.

The thinning of the fibre by removal of material in the useful cladding and optionally in the core makes it possible to maintain a good rigidity of the fibre necessary for its use, compared with the methods of the state of the art. The removal of the protective cladding can come under a preliminary step utilizing a different acid from that used for the recess in the useful cladding and optionally in the core.

Advantageously, the step of depositing the layer of scintillators comprises a step of illuminating the fibre with UV or visible light.

In particular, the thinning step can be carried out by chemical etching and can comprise the following steps:
 immersing the fibre over a predetermined length in a solution provided to dissolve the protective cladding,
 immersing the unclad fibre in a solution provided to dissolve the useful cladding and/or the fibre core,
 vertically displacing (along its axis of revolution) the fibre at a predetermined speed or at a succession of predetermined speeds.

The solution for recessing the useful cladding and/or the core can be a hydrofluoric acid.

The solution can be covered with a liquid film (oils, silicone, etc.) making it possible to stabilize the recessing process at the dimensions and the desired geometry of the structured fibre.

The predetermined length can be equal to the length of the detection portion.

Such an embodiment makes it possible to obtain a variable frustoconical extended conical shape, or another shape, as a function of the speed applied, fixed or variable, or the combination of the two.

In order to obtain a cylindrical shape (straight cylinder), the detection portion of the optical fibre is submerged in a bath containing said solution, statically, for a predetermined duration. This duration depends on the depth of the recess to be produced. A longer duration can make it possible to obtain a short conical shape when the fibre core is etched particularly at its end.

In a particular embodiment, the thinning step can be carried out by polishing the useful cladding, and optionally the fibre core. The protective cladding is removed beforehand over at least the detection portion.

In a particular embodiment, the method according to the invention also comprises at least one step of depositing a metallic layer, following the step of depositing the layer of scintillators.

According to an aspect of the invention, an endoscopic probe for detecting high-energy ionizing radiation comprising at least one detector according to the invention is proposed.

In an embodiment, the probe according to the invention can comprise a plurality of detectors and the ends of said detectors are arranged in one and the same plane.

In an embodiment, the probe according to the invention can comprise a plurality of detectors the ends of which are inscribed in parallel planes separated by a non-zero distance (502).

The probe can comprise a number of detectors comprised between 2 and 20 detectors.

Advantageously, the probe according to the invention can comprise a CMOS camera or a CCD camera connected to at least one, in particular all, of the detectors.

BRIEF DESCRIPTION OF THE DRAWINGS

Other advantages and characteristics will become apparent on examining the detailed description of embodiment examples that are in no way limitative, and from the attached drawings, in which:

FIG. 1*a* is a diagrammatic representation of a side cross-section view of a first example of the detector according to the invention with a first recess shape;

FIG. 1*b* is a diagrammatic representation of a side cross-section view of a second example of the detector according to the invention with a second recess shape;

FIG. 1*c* is a diagrammatic representation of a side cross-section view of a third example of the detector according to the invention with a third recess shape;

FIG. 1*d* is a diagrammatic representation of a side cross-section view of a fourth example of the detector according to the invention with a fourth recess shape;

FIG. 1e is a diagrammatic representation of a side cross-section view of a fifth example of the detector according to the invention with a fifth recess shape;

FIG. 2 is a diagrammatic representation of an example of a probe according to the invention; and FIG. 3 is a diagrammatic representation of an example of the method according to the invention.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

FIGS. 1a, 1b, 1c and 1d are diagrammatic representations of a side cross-section view of examples of the detector according to the invention with several recess shapes.

The detector 100 in FIG. 1a is configured to detect rays having an energy comprised between 100 eV and 500 MeV, preferably between 0.1 MeV and 500 MeV.

The detector 100 comprises an optical fibre 102 which comprises a fibre core 104 surrounded by a first cladding 106, called useful cladding, and a second cladding 108, called protective cladding, surrounding the useful cladding 106. The outer diameter of the optical fibre is comprised between 75 microns and 250 microns, in particular equal to 95 microns. The optical fibre 102 can have a length greater than 1 m.

The optical fibre 102 comprises a portion 110, called detection portion, arranged at its end. The detection portion 110 extends over a length comprised between 0.1 mm and 5 mm, in particular equal to 5 mm, and comprises a recess so that the end of the optical fibre 102 forms a cone 114, pointing outwards. The recess 120 corresponds to the portion of the optical fibre that has been removed. The cone 114 is formed by removing material from the protective cladding 108, from the useful cladding 106 and from the fibre core 104.

The protective cladding 108 is removed in a previous step. It can for example be removed using a sulfuric acid which will etch this cladding without degrading the rest of the fibre, namely the core 104 and the useful cladding 106. Other solutions exist, either by chemical etching or by mechanical removal.

The detector 100 also comprises, in the detection portion 110, a layer of scintillators 116 arranged in contact with the useful cladding 106 and the fibre core 104. The layer of scintillators 116 has a thickness comprised between 20 microns and 100 microns, in particular equal to 50 microns.

The layer of scintillators moulds to the conical shape of the point by completely covering the outer surface of the fibre core 104, the outer surface bared by producing the recess 120. The layer of scintillators also extends until it partially covers the outer surface of the useful cladding 106, the outer surface bared by producing the recess 120.

The layer of scintillators 116 is formed by immersing the detection portion of the optical fibre in a polymer/scintillators mixture during polymerization. The polymer makes it possible to agglomerate the scintillators and acts as an adhesive.

The detection portion 110 in the shape of a cone 114 offers a large contact surface between the layer of scintillators 116 on the one hand and the useful cladding 106 and the fibre core 104 on the other hand. This greatly improves the optical coupling. The luminescence emitted by the layer of scintillators 116 and directed towards the fibre is thus increased compared with devices where the scintillators are arranged at the end of the fibre cut orthogonally to the axis of revolution.

In addition, the cone 114 formed in the detection portion 110 makes it possible to maintain a good rigidity of the optical fibre necessary for its use. The detector 100 also comprises a photon counter 118 connected to the optical fibre 102 and configured to measure a quantity of light emitted by the layer of scintillators 116 and directed through the fibre core 104.

FIG. 1b is a diagrammatic representation of a detector 200 seen from the side in cross-section. The detector 200 comprises the same elements as the detector 100 in FIG. 1a, but with different shapes. Over a portion of the end of the optical fibre 102, the protective cladding is removed, leaving the useful cladding 106 bare. Over a detection portion 110, the useful cladding 106 has been subjected to chemical etching making it possible to form a first cone frustum 202, without a point. The fibre core is not bared at this location. Then, a second cone frustum 204 that is longer than the first and has a solid angle that is smaller than the solid angle of the first cone frustum, is created after the first cone frustum. Thus, the thickness of the useful cladding thins down to nothing at one end 123 where the fibre core is cut at right angles. Thus, the detection portion 110 was created by the creation of a recess with a complex shape extending from the protective cladding 108 up to the useful cladding 106. In this arrangement example, the layer of scintillators covers and is in direct contact with the end of the fibre core, over all of its radial cross-section.

The layer of scintillators 116 is arranged around the useful cladding 106 in contact with the outer surface of the first and second cone frustums 202 and 204. The layer of scintillators is flush with the outer surface of the portion of the useful cladding that has not been etched.

The detector 200 also comprises a thin metallic layer 206 produced around the layer of scintillators 106. The metallic layer 206 is a deposit of aluminium (Al) or gold (Au) with a thickness less than 200 nm. The metallic layer 206 makes it possible to reflect the light emitted by the layer of scintillators 116 and direct it towards the fibre core 104. The detector 200 is thus more sensitive.

FIG. 1c describes a detector which uses the same configuration as the detector 200 in FIG. 1b, the only difference being that the end of the fibre core is not cut at right angles but extends to a point 124.

FIG. 1d is a diagrammatic representation of a detector 300 seen from the side in cross-section. The detector 300 comprises the same elements as the detector 100 in FIG. 1a. It differs in that the detection portion 110 of the detector 300 is arranged at a distance from the end of the optical fibre 102 comprised between 2 mm and 10 cm, in particular equal to 1 cm. This arrangement makes it possible to maintain a good rigidity of the optical fibre 102 despite the production of a recess and the deposition of a layer of scintillators in the protective cladding 108, the useful cladding 106 and the fibre core 104.

In addition, the recess in the detector 300 forms two frustoconical portions 302 and 304 opposite one another, head to tail, so that a groove is produced in the fibre core. The layer of scintillators 116 completely fills the recess produced and is flush with the outer surface of the protective cladding 108.

FIG. 1e is a diagrammatic representation of a detector 400 seen from the side in cross-section. The detector 400 comprises the same elements as the detector 100 in FIG. 1a. It differs in that the recess is in the shape of a flat spot 402 arranged at the end of the optical fibre 102 and only on one segment. Over the detection portion 110, the recess is hollowed out from the protective cladding 108, through the useful cladding 106 and up to a portion of the fibre core. The layer of scintillators 116 completely fills the recess produced.

FIG. 2 is a diagrammatic representation of an example of the probe according to the invention.

The probe 500 comprises a plurality of detectors 100 arranged in a bundle. By way of example, the probe 500 can comprise an arrangement of one and the same type of detectors or different types of detectors among the detectors 100, 200, 300 and 400.

In FIG. 2, the ends of the detectors 100 are separated from one another by a distance 502 that is constant or variable, comprised between 0.5 cm and 10 cm.

The layers of scintillators 116 of the detectors 100 emit light 506 when the probe 500 is subjected to ionizing radiation 504. This light 506 is captured by the fibre cores 104 and is directed towards a camera (CCD, CMOS or other) connected to the detectors 100.

In other words, under irradiation, the thin scintillating layer 116 emits a luminescence collected and transferred through the optical fibre towards an optical detector placed at a distance, at the other end of the optical fibre.

This embodiment can advantageously be applied to the case of a probe constituted by several detectors of the same type or different types among the detectors 100, 200, 300 and 400.

FIG. 3 is a diagrammatic representation of an example of the method according to the invention.

The method 600 is a method for manufacturing a detector 100, 200, 300 and/or 400.

The method 600 comprises a step of thinning 602 the optical fibre 102, over the detection portion, by removing material from the protective cladding 108 and/or the useful cladding 106 and/or the fibre core 102 so as to form the recess in the optical fibre 102.

The thinning step 602 comprises at least one step of immersing the optical fibre 102 over its detection portion 110 in a solution provided to dissolve the protective cladding 108 and/or the useful cladding 106 and/or the fibre core 102.

The method 600 also comprises a step of depositing 604 the layer of scintillators 116 in said recess by photopolymerization. The deposition step 604 comprises a step of illuminating the optical fibre 102 with UV or visible light.

The method 600 can also comprise a step of depositing 608 the metallic layer 206, for example by spraying or vaporizing a metal such as aluminium or gold.

The structure at the end of the fibre according to the present invention makes it possible to collect and transfer a maximum of luminescence towards the optical fibre.

The thinned shape of the optical fibre (taper) promotes the collection of the luminescence. This allows:

a satisfactory attachment of the scintillators to the optical fibre, a homogenization of the effectiveness of the collection of the luminescence over the entire length of the fibre covered by the scintillating layer, hence an optimization of the sensitivity of the probe given the low emission yield of the scintillators under irradiation.

The miniaturization can make it possible to obtain ultra-compact and invisible in vivo sensors, i.e. limiting the attenuation of the radiation in a biological medium or the water equivalent to less than 1%.

Because of the improvement of the fibre/scintillator coupling, it is possible to reduce the diameter of the optical fibre. This can thus make it possible to produce multi-sensors that are sufficiently narrow to be compatible with endoscopy in particular.

The invention advantageously applies to the production of sensors, constituted by one or more fibre optic probes according to the invention, in particular for in vivo dosimetry of ionizing radiation in real time. The present invention can have applications in the field of medical therapy: external beam radiotherapy, proton therapy, hadron therapy, brachytherapy (or Curie therapy), etc.

Of course, the invention is not limited to the examples that have just been described, and numerous modifications may be made to these examples without exceeding the scope of the invention.

The invention claimed is:

1. A detector for high-energy ionizing radiation, greater than 100 eV, comprising:
   an optical fibre having an outer diameter, called fibre diameter, less than 250 microns, and comprising a fibre core, a first cladding, called useful cladding, surrounding said fibre core and a second cladding, called protective cladding, surrounding said useful cladding;
   a layer of scintillators provided to convert said ionizing radiation into light; and
   a portion, called detection portion, arranged over a length of said fibre and comprising a recess formed in the protective cladding, in the useful cladding and/or in the fibre core; the layer of scintillators being arranged in said recess in contact with the useful cladding and the fibre core.

2. The detector according to claim 1, characterized in that the layer of scintillators is completely contained in the recess and is flush with the outer surface of the protective cladding.

3. The detector according to claim 1, characterized in that it comprises, in the detection portion, a metallic layer surrounding the layer of scintillators.

4. The detector according to claim 1, characterized in that the detection portion is arranged at the end of the fibre.

5. The detector according to claim 4, characterized in that the layer of scintillators extends over the whole end of the fibre onto its transverse section.

6. The detector according to claim 1, characterized in that the detection portion is arranged at a non-zero distance from the end of the fibre.

7. The detector according to claim 6, characterized in that the recess extends inside the core of the fibre so that the layer of scintillators is in direct contact with the inside of the fibre core.

8. The detector according to claim 1, characterized in that the recess extends around an axis of revolution of the fibre.

9. The detector according to claim 8, characterized in that the recess forms a cone in the detection portion.

10. A device according to claim 1, characterized in that it comprises a photon counter connected to the optical fibre.

11. A method for manufacturing a detector for high-energy ionizing radiation according to claim 1, comprising at least the following steps:

thinning the optical fibre, over the detection portion, by removing the protective cladding and creating a recess in the useful cladding and/or in the core of the fibre; and depositing a layer of scintillators in said recess by photopolymerization.

12. The method according to claim 11, characterized in that the thinning step is carried out by chemical etching and comprises the following steps:

immersing the fibre over a predetermined length in a solution provided to dissolve the protective cladding;

immersing the unclad fibre in a solution provided to dissolve the useful cladding and/or the fibre core; and vertically displacing the fibre at a predetermined speed or at a succession of predetermined speeds.

13. An endoscopic probe for detecting high-energy ionizing radiation comprising at least one detector according to claim 1.

14. The probe according to claim 13, characterized in that it comprises a plurality of detectors and the ends of said detectors are arranged in one and the same plane.

15. The probe according to claim 13, characterized in that it comprises a plurality of detectors the ends of which are inscribed in parallel planes separated by a non-zero distance.

* * * * *